(12) United States Patent
Collie et al.

(10) Patent No.: US 7,017,112 B2
(45) Date of Patent: Mar. 21, 2006

(54) IMPORTING AND EXPORTING MARKUP LANGUAGE DATA IN A SPREADSHEET APPLICATION DOCUMENT

(75) Inventors: Robert Collie, Kirkland, WA (US); Chad Rothschiller, Edmonds, WA (US); Ulrich Homann, Kirkland, WA (US); Joseph Chirilov, Kirkland, WA (US); Kelly J. Lynch, Redmond, WA (US); Ramakrishnan Natarajan, Redmond, WA (US); Eoin Burke, Seattle, WA (US); Juha Niemisto, Mercer Island, WA (US); Michael J. McCormack, Snohomish, WA (US); Parul Dalia, Kirkland, WA (US); Marise Chan, Redmond, WA (US); James Rivera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 10/377,145

(22) Filed: Feb. 28, 2003

(65) Prior Publication Data

US 2004/0172592 A1 Sep. 2, 2004

(51) Int. Cl.
G06F 15/00 (2006.01)
(52) U.S. Cl. .................. 715/513; 715/503; 715/526
(58) Field of Classification Search ................ 715/513, 715/503, 501.1, 526, 529
See application file for complete search history.

(56) References Cited

U.S. PATENT DOCUMENTS

| | | | |
|---|---|---|---|
| 6,418,446 B1 | 7/2002 | Lection et al. .............. | 707/103 |
| 6,476,833 B1 | 11/2002 | Moshfeghi .................. | 345/854 |
| 6,480,860 B1 | 11/2002 | Monday ...................... | 707/102 |
| 6,480,865 B1 | 11/2002 | Lee et al. ................... | 707/523 |
| 6,487,566 B1 | 11/2002 | Sundaresan ................. | 707/513 |
| 6,502,112 B1 | 12/2002 | Baisley ....................... | 707/513 |
| 6,631,497 B1 * | 10/2003 | Jamshidi et al. ............ | 715/514 |
| 2002/0129054 A1 * | 9/2002 | Ferguson et al. ........... | 707/503 |
| 2005/0015379 A1 * | 1/2005 | Aureglia et al. ............ | 707/100 |
| 2005/0022111 A1 * | 1/2005 | Collet et al. ................ | 715/503 |

OTHER PUBLICATIONS

Chan et al., "Efficient Filtering of XML Documents with XPath Expressions", IEEE, Feb. 26, 2002, pp. 1-10.*
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, 2000-2002, pp. 1-10.
Quin, Liam, "Extensible Markup Language (XML)", W3C Architecture Domain, 1996-2002, pp. 1-3.

(Continued)

Primary Examiner—William Bashore
Assistant Examiner—Maikhanh Nguyen
(74) Attorney, Agent, or Firm—Merchant & Gould (57) ABSTRACT

Methods and systems are provided for importing and exporting markup language formatted data into a spreadsheet document. XML data is associated with a schema file defining data types and data type definitions for applying the XML data to the document. A map is prepared that relates any XML data applied to the document back to corresponding elements or attributes defined in the schema file. When the document is imported into a spreadsheet application grid, the map is parsed to find XPATHs which determine the location, data types and user data for each cell or list object in the document related to the schema file. The cells and lists are populated with the XML data and user data and rendered according to formatting dictated by the XML data applied to the document. The document may be exported such that the XML data is maintained for subsequent import and use.

24 Claims, 5 Drawing Sheets

OTHER PUBLICATIONS

Clark, James, and DeRose, Steve, "XML Path Language (XPath), Version 1.0", W3C, 1999-2000, pp. 1-31.
"Microsoft BizTalk Server 2002—Using BizTalk Mapper", Microsoft Corporation, 1999-2001, pp. 1-2.
"BizTalk Server 2002 Mapper User Interface", Microsoft Corporation, 1999-2001, pp. 1.
"BizTalk Server 2002 Compiling Data", Microsoft Corporation, 1999-2001, pp. 1.
"BizTalk Server 2002 Testing Maps", Microsoft Corporation, 1999-2001, pp. 1-2.
"BizTalk Server 2002 View Links and Functoids By Using Grid Preview", Microsoft Corportion, 1999-2001, pp. 1.
"The StarOffice™ 6.0 Suite: New Features Guide", Sun Microsystems, V. 1.1, Jul. 2002, pp. 1-31.
"New Microsoft Office Family Application Taps Power of Industry-Standard XML", Microsoft Corporation, Oct. 2002-Feb. 2003, pp. 1-2.
"Q&A: How 'XDocs' Alters the Paradigm for Gathering Business-Critical Information", Microsoft Corporation, Oct. 2002-Feb. 2003, pp. 1-4.
"InfoPath: Microsoft Names New Product from Office Group", Microsoft Corporation, Oct. 2002-Feb. 2003, pp. 1-4.
"Microsoft Unveils Visual Studio.NET Enterprise Tools", Microsoft Corporation, May 2001, pp. 1-4.
"Microsoft Extends XML Web Services Support in .NET Enterprise Servers Through Visual Studio .NET", Microsoft Corporation, Feb. 2002, pp. 1-3.
"How to Use XSL to Transform Excel XML Spreadsheet for Server-Side Use", Microsoft Corporation, Aug. 2004, pp. 1-7.
"Integrated Development Environment (IDE)", Jun. 2002, pp. 1-2.
"Altova markup your mind!", Dec. 2002, pp. 1-3.
"Arbortext and Accessibility", Dec. 2002, pp. 1-5.
"XML Compliance, 100% Pure XML", Dec. 2002, pp. 1-3.
"Schemas", Dec. 2002, pp. 1-3.
"Arbortext's Support for XSL-FO", Dec. 2002, pp. 1-4.
"Altova markup your mind!", Dec. 2002, pp. 1-3.
"Corel XMetal 4 and Interwoven TeamXML", Aug. 2003, pp. 1-2.
"The Corel-XyEnterprise XML Solution", Aug. 2003, pp. 1-2.

* cited by examiner

IMPORTING AND EXPORTING MARKUP LANGUAGE DATA IN A SPREADSHEET APPLICATION DOCUMENT

FIELD OF THE INVENTION

The present invention relates generally to importing markup language data to and exporting markup language data from a spreadsheet document. More particularly, the present invention relates to importing an eXtensible Markup Language file into a spreadsheet document and to exporting an eXtensible Markup Language document from a spreadsheet document.

BACKGROUND OF THE INVENTION

Computer software applications allow users to create a variety of documents for use in work, education and leisure. For example, a spreadsheet application allows users to store, manipulate, print and display a variety of alphanumeric data. A word processing application allows users to create letters, articles, books, memoranda, and the like. Such applications have a number of well-known strengths, including rich editing, formatting and calculation.

To keep up with demands for more advanced functionality for such computer software applications, software developers have begun to use structured data formats, including markup languages such as eXtensible Markup Language (XML), to allow users to annotate a software application document to give the document a useful structure apart from the normal functionality of the software application responsible for creating the document or the visible formatting associated with the document. For example, the user may wish to create using her spreadsheet application a template document for preparation of a purchase order to be used in her company's sales department. By applying structure to the document, purchasers or other institutions or persons receiving the document may make use of the structure by processing the document to utilize data defined by the document structure spreadsheet application spreadsheet application spreadsheet application.

Some software applications, such as word processing applications, allow users to annotate a document with XML elements so that the user may define certain data types and data definitions for data inserted into the document. A resume document, for example, may include an "experience" section in which the user will include present and past work experience. Using XML, the user may desire to markup the "experience" section of the document to define that certain allowable information in a prescribed order and in a prescribed number may be included in the "experience" section of the document. For example, the user may wish to markup the experience section of the document to allow four present or past experience items.

Unfortunately, prior art spreadsheet applications allow very limited use of XML data. Bulk XML data may be imported where the user points to an XML file and the spreadsheet application imports that file into the spreadsheet grid. But, the user gets no control over how the data is laid out or which data is imported because all of the data is imported. Under prior spreadsheet applications, manual coding of XML data to a spreadsheet application may be required in which a programmer writes their own custom code for handling import and/or export of XML data. This code may be in the form of an XSLT transformation file, or it may be a more traditional programming language like VBA or C++. Such custom programming is time consuming, expensive and is difficult to apply generally to spreadsheet documents.

Prior spreadsheet applications do not establish a relationship between the XML data and the spreadsheet grid. A relationship between the XML data and the grid allows the user to have a custom view of the XML data. For example, if a user only wants elements <a>, <b>, and <e> to show up in the grid, and to skip elements <c> and <d>, that preference needs to be stored somewhere. Furthermore, if the user wants element <b> to be displayed first and show up in column A, followed by elements <a> and <e> in columns B and C, that preference needs to be stored as well. If the user wants the data to begin appearing in row 6 rather than at the top of the grid sheet, that preference will need to be stored as well. Because prior spreadsheet applications allow no custom control over how the data is imported and displayed, there is nothing for the spreadsheet application to remember about the data. Accordingly, no relationship, between the spreadsheet and the XML data is established.

Accordingly there is a need in the art for methods and systems that allow users to import and/or export XML data to and from spreadsheet grids. There is further a need for methods and systems for that allow spreadsheet documents to exchange data with other XML-enabled applications whether or not the other applications understand the programming or functionality of the spreadsheet application. There is further a need for methods and systems that allow users to build custom spreadsheet application views of XML data so that they may readily view, analyze, edit, and produce XML data. There is further a need for methods and systems that allow programmers to write programs that interact directly with XML data in a spreadsheet grid using an XML context.

It is with respect to these and other considerations that the present invention has been made.

SUMMARY OF THE INVENTION

Embodiments of the present invention provide methods and systems for importing markup language formatted data into a spreadsheet document and for exporting markup language formatted data from a spreadsheet document. More particularly, embodiments of the present invention solve the above and other problems by providing methods and systems for importing eXtensible Markup Language (XML) data and associated user data, if available, into a spreadsheet document and for exporting XML data and associated user data, if available, from a spreadsheet document.

According to one aspect of the invention, an XML document or XML data is associated with an XML schema file defining XML data types and data type definitions for applying XML data to the spreadsheet document. An XML data map is prepared that relates a spreadsheet grid to the schema file. Generally, the map is the relationship between the grid and the XML schema. Element <a> goes in cell B1, for instance. The map contains an XPATH that points to element <a>, and the XPATH is paired with a grid reference. The mapping is essentially a collection of pairings where for each pairing a given XML element or attribute referenced by an XPATH corresponds to a given location in the grid.

When the XML document is subsequently imported into a spreadsheet application grid, the XML map is selected for determining the relationships between XML data applied to the spreadsheet application document and the XML schema file associated with the document. The XML data map is parsed to find XPATHs in the imported spreadsheet document pointing in the document to an associated schema file. Each XPATH is executed to determine the location, data types and user data for each cell or list object in the document that is related back to the associated schema file. The cells and lists are populated with associated XML data in locations in the grid where the XML data is mapped and according to the rules (element names, syntax, etc.) of the associated schema file. That is, the grid is populated with XML data, and the data lands in the proper cells, lists, and columns according to the relationships between the spreadsheet grid and schema as specified in the XML data map.

According to another aspect of the invention, after an imported XML document has been edited, the data in that document may be exported as XML data. Similarly, a mapped spreadsheet document can be used as a blank template. The user opens the spreadsheet document (template), enters data into the mapped regions, and then exports the data as XML data. In either case, the exported XML data may be processed by any other XML-enabled application, for example, another desktop application, a backend database, a spreadsheet document that has been mapped to the same schema, and the like.

Prior to exporting the edited or created document, an XML data map relating XML data in the document to associated elements or attributes of a selected XML schema file is selected. The XML data map is iterated to find the location of each cell or list object in the document that contains XML data and to locate an XPATH in each of such cell or list object for pointing the XML data associated with the cell or list object back to associated XML elements or attributes in the selected XML schema file. Each XML element or attribute applied to the document and located by parsing the XML data map is applied to a generalized instance structure of the selected XML schema file to create a hierarchically-structured instance structure of the XML data applied to the document. The data for cells or list objects located in the document by parsing the XML data map are extracted and are arranged hierarchically according to the generalized instance structure. The hierarchical arrangement of the XML data and associated user data is written to memory or is exported for other subsequent uses.

These and other features and advantages, which characterize the present invention, will be apparent from the reading the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

The following description of embodiments of the present invention is made with reference to the above-described drawings where in like numerals refer to like parts or components throughout the several figures. The present invention is directed to methods and systems for importing markup language formatted data into a spreadsheet document and for exporting the markup language-formatted from a spreadsheet document.

Figure 1:
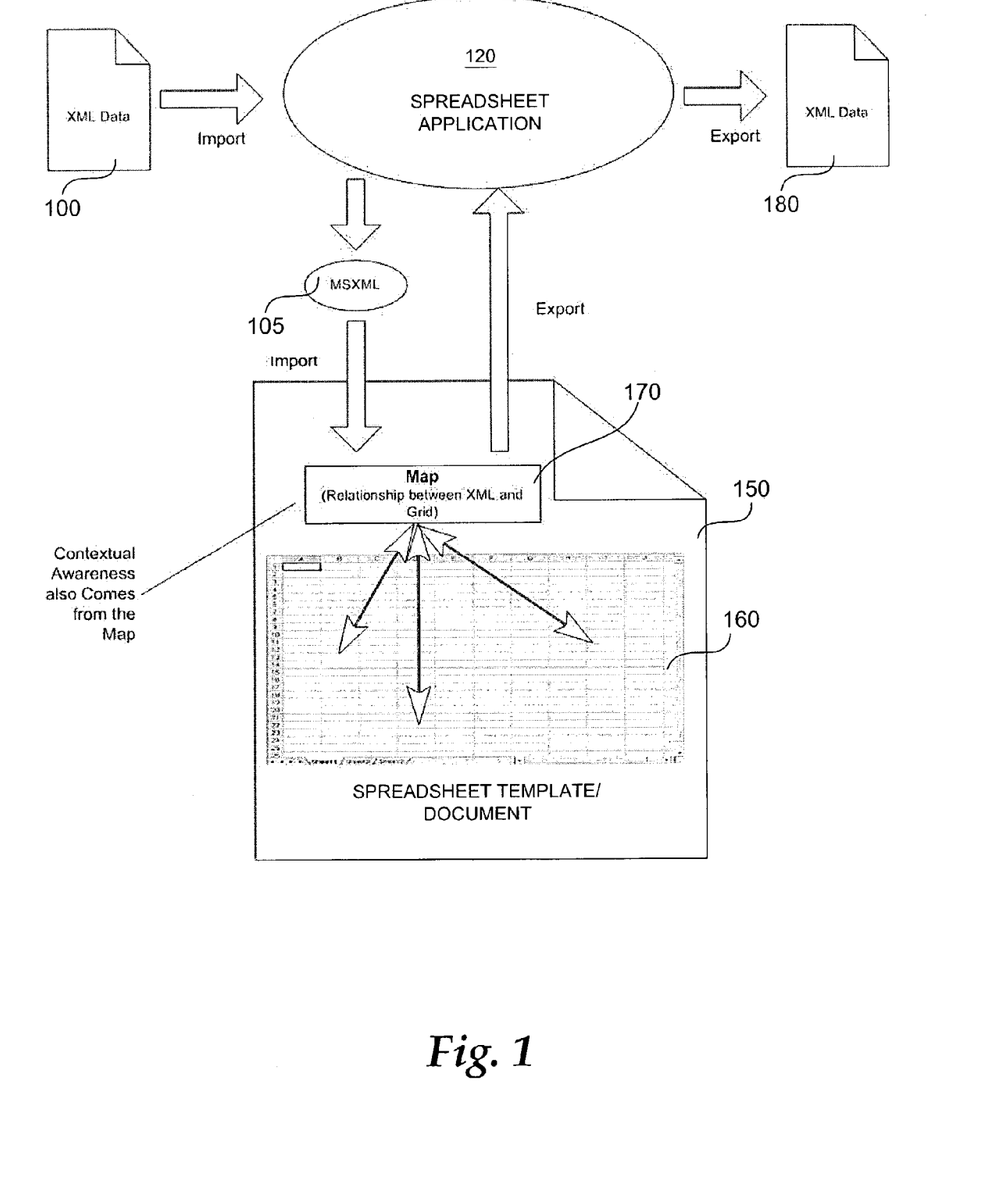
FIG. 1 is a simplified block diagram illustrating the importing of eXtensible Markup Language data into a spreadsheet document and showing the exporting of eXtensible Markup Language data from a spreadsheet document.

Referring now to FIG. 1, a simplified block diagram illustrating importing markup language-formatted data into a spreadsheet document and illustrating exporting markup language-formatted data from a spreadsheet. document is described. According to embodiments of the present invention, a preferred markup language for use in accordance with the present invention is the eXtensible Markup Language (XML). In one embodiment, the present invention is incorporated into the OFFICE™ suite of application programs that is manufactured and marked by Microsoft Corporation of Redmond, Wash. A suitable spreadsheet application for use in accordance with the present invention is spreadsheet application® manufactured and marketed by Microsoft Corporation of Redmond, Wash.

Referring to FIG. 1, an embodiment of the present invention provides a spreadsheet application the ability to natively understand custom markup language data, such as XML data. For example, if an XML data file 100 contains quarterly financial results prepared according to an XML schema file (for example, an XSD file), embodiments of the present invention allow that XML data to be imported into a spreadsheet document 150 or template with a single import function, such as clicking an import button provided by the spreadsheet application 120. Accordingly, the imported data will "land" in the spreadsheet document or template 150 in the appropriate cells and columns of the spreadsheet grid 160 as specified by the designer/creator of the template or document. That is, if the user imports an XML document having two elements for "date" and "amount" data associated with company sales, an embodiment of the present invention will cause the data from the two elements to import into a position in the target grid 160 in the same positions as specified by the map.

As described above, a user may import XML data into a spreadsheet grid and edit that data for subsequent export. Or, a user may start with a blank mapped grid (for example, a grid that has XML data mapped to it, but no other data) and enter data to the blank mapped grid for subsequent export. However, if a user adds new data, for example, a new column of data to the spreadsheet grid, that data must be mapped to the XML schema file in order for XML data entered for the new column to be included in the exported XML data.

Figure 2:
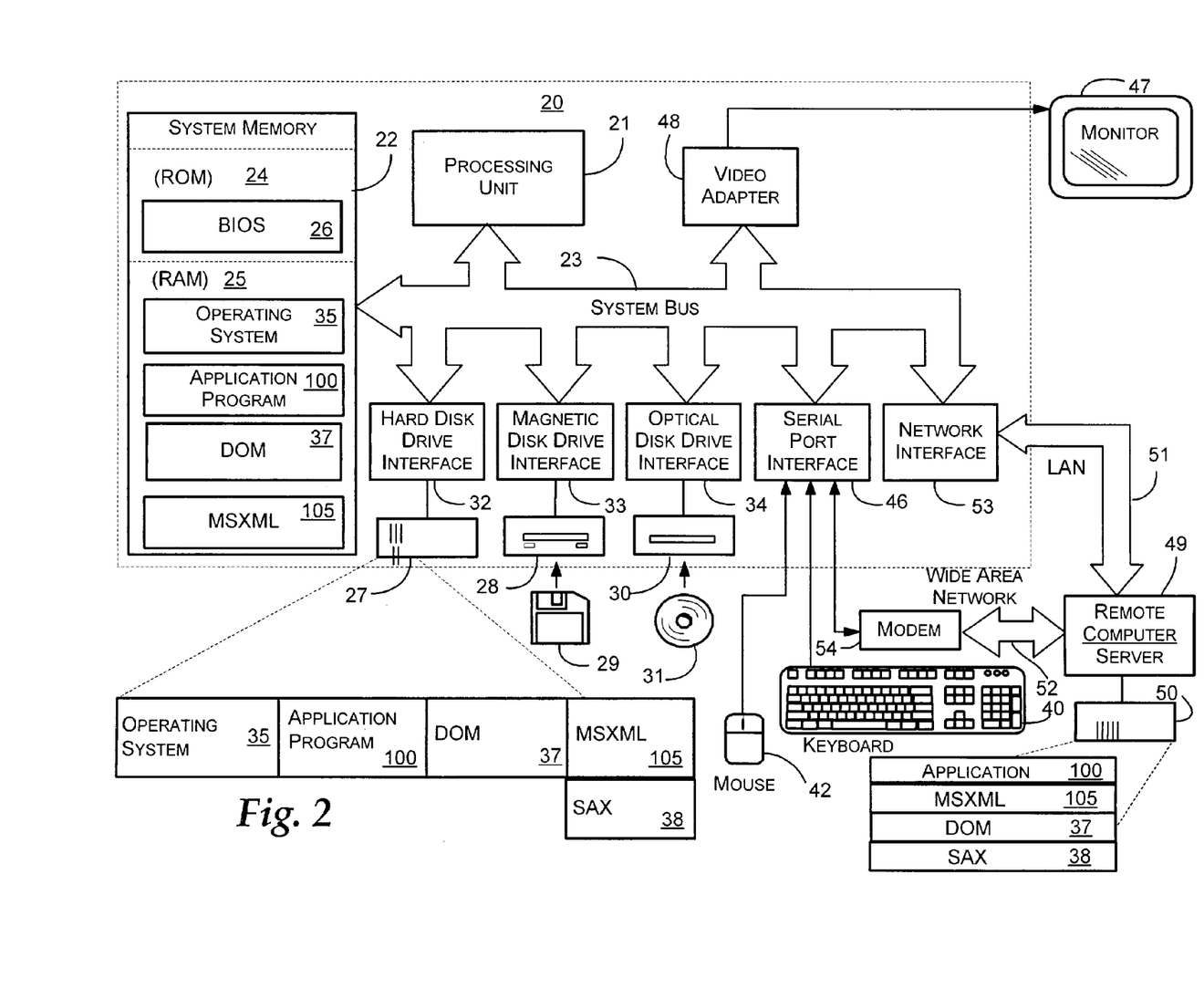
FIG. 2 is a block diagram of a computer and associated peripheral and networked devices that provide an exemplary operating environment for the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 and one or more application programs 100, such as a spreadsheet application program, a word processor program, or other type of program module. Other program modules illustrated in FIG. 2 include an XML processing module 105, a document object model (DOM) parser 37, and a simple application programming interface for XML (SAX) parser 38. According to an embodiment of the invention, the XML module 105 is used by the spreadsheet application 100 for processing data formatted according to the eXtensible Markup Language. A suitable XML processing module is MSXML manufactured and marketed by Microsoft Corporation of Redmond, Wash.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In order to provide the document with a set of grammatical and data type rules governing the types and structure of data that may be included in a given document an XML schema is attached to or associated with the document for providing the rules governing each of the XML elements and tags with which the user may annotate the given document. For example, a "purchase order" document may have an attached or associated schema such as "purchaseorder-schema.xsd" for providing the allowable set of XML elements such as a <date> element, <price> element, <quantity> element, and so on. The schema includes the rules governing the order with which those elements may be applied to the document and specific rules associated with individual elements applied to the document. For example, a schema attached or associated with the "purchase order" document may prescribe that data associated with a given element, for example a <date> element, must include a day element, followed by a month element, followed by a year element. Additionally, the schema may require that a <date> element must immediately precede a <shipment destination> element, for example.

As is understood by those skilled in the art, developers of XML schemas determine the names of XML elements and the associated data types and data structures allowed for those elements. Then, all users of documents annotated with XML structure according to a given schema may utilize the data contained within the XML structure without regard to the overall type and structure of the document. For example, if a "purchase order" document, described above, is transmitted to a purchaser of the goods, the purchaser may develop software applications for parsing the document to locate specific types of data within the document for use by the purchaser. The purchaser may, for example only wish to print serial numbers and associated prices for certain goods. Using the schema attached to the document, the purchaser will know that the data associated with the XML elements have been prepared according to the schema governing the document. Accordingly, the purchaser may develop a software application or an extensible Stylesheet Language Transformation (XSLT) file for locating the <price> element and for extracting the data associated therewith for insertion into the purchaser's own documents.

Following with this example, a number of different purchasers may subscribe to the same schema for dictating the rules associated with the "purchase order" document so that each purchaser may then receive the "purchase order" document from the author of the document and use the data contained in the purchase order according to the XML elements structuring the data. That is, a first purchaser may only be interested in the data contained within the <price> element, while a second purchaser may be interested in extracting only the data contained in a <shipment terms> element. Each purchaser may extract the data it desires without regard to other aspects or elements of the document by using their own software applications or XSLT transformation files for locating the desired data according to the XML structure. This is made possible by the fact that each user of the document follows the data type and data structure rules prescribed in the schema attached to or associated with the document.

As understood by those familiar with the eXtensible Markup Language, XML namespaces provide a method for qualifying elements and attribute names used in XML documents by associating those elements and attribute names with namespaces identified by uniform resources identifier (URI) references. An XML namespace is a collection of names, identified by a URI reference, which are used in XML documents as element types and attribute names. A single XML document may contain elements and attributes that are defined for and used by multiple software modules. For example, in accordance with an embodiment of the present invention, a single XML document, such as a spreadsheet document, may contain elements and attributes defined and used by different software modules. For example, a spreadsheet document may have elements and attributes defined for and used by a spreadsheet application XML processing module, or the document may contain elements and attributes defined for and used by or associated with one or more schema files associated with the document. For example, elements and attributes may be associated with the spreadsheet document to associate the document with a schema file associated with a purchase order, resume document, a legal document, and the like. Accordingly, an individual document, such as an exemplary spreadsheet document may have a namespace identifying the element types and attribute names associated with each of the different software modules that may consume or use data from the document. A set of standard XML data types has been defined by the World Wide Web consortium (W3C), the disclosure of which is incorporated here and by reference.

In order to import an XML data file to a spreadsheet document and in order to export an XML data file from a spreadsheet document, the spreadsheet application "remembers" the relationships between cells and list objects in the spreadsheet application grid and corresponding elements or attributes of an associated XML schema file defining the structure/blueprint of XML data documents corresponding to that schema file. In order to remember the relationship between the cells and/or list objects and elements or attributes of the associated XML schema file, cells and/or list objects are mapped to associated elements or attributes in the schema file. For example, if a cell is supposed to receive data when an XML data file is imported, that cell is referred to as a "mapped" cell as opposed to an "unmapped" cell that may receive data entered by a user, but that does not receive data associated with an XML schema file attached to or associated with the imported XML data file. In order to map a cell or list object with an associated element or attribute of the XML schema file, markers known as XPATHs are stored in the spreadsheet document to point a given cell or list object to a corresponding element or attribute in an associated XML schema file. Use of and operation of XPATHs are defined by the World Wide Web consortium.

Accordingly, the mapping is a collection of XPATH markers that define a relationship between the spreadsheet application grid and a particular XML schema file where the XPATH is a pointer back to the associated schema file. For example, if cell B1 has an XPATH marker that points to the <date> element in an associated XML schema file, the relationship between cell B1 and the <date> element of the associated schema file is maintained when an XML data file containing the relationship between cell B1 and the associated schema file is imported to a spreadsheet document 150 via a spreadsheet application 120. For example, if the imported XML data file 100 includes a <date> element with value "2 Jan. 2003", and the map in the spreadsheet document specifies that cell B1 of the document 150 is related to the <date> element (by an XPATH referencing the <date> element), then cell B1 will contain "2 Jan. 2003" once the import is finished. For a further description of mapping data in a document to an associated schema file, see U.S. patent application Ser. No. 10/377,256, entitled "Markup Language Visual Mapping", which is incorporated herein by reference as if fully set out herein.

Figure 3:
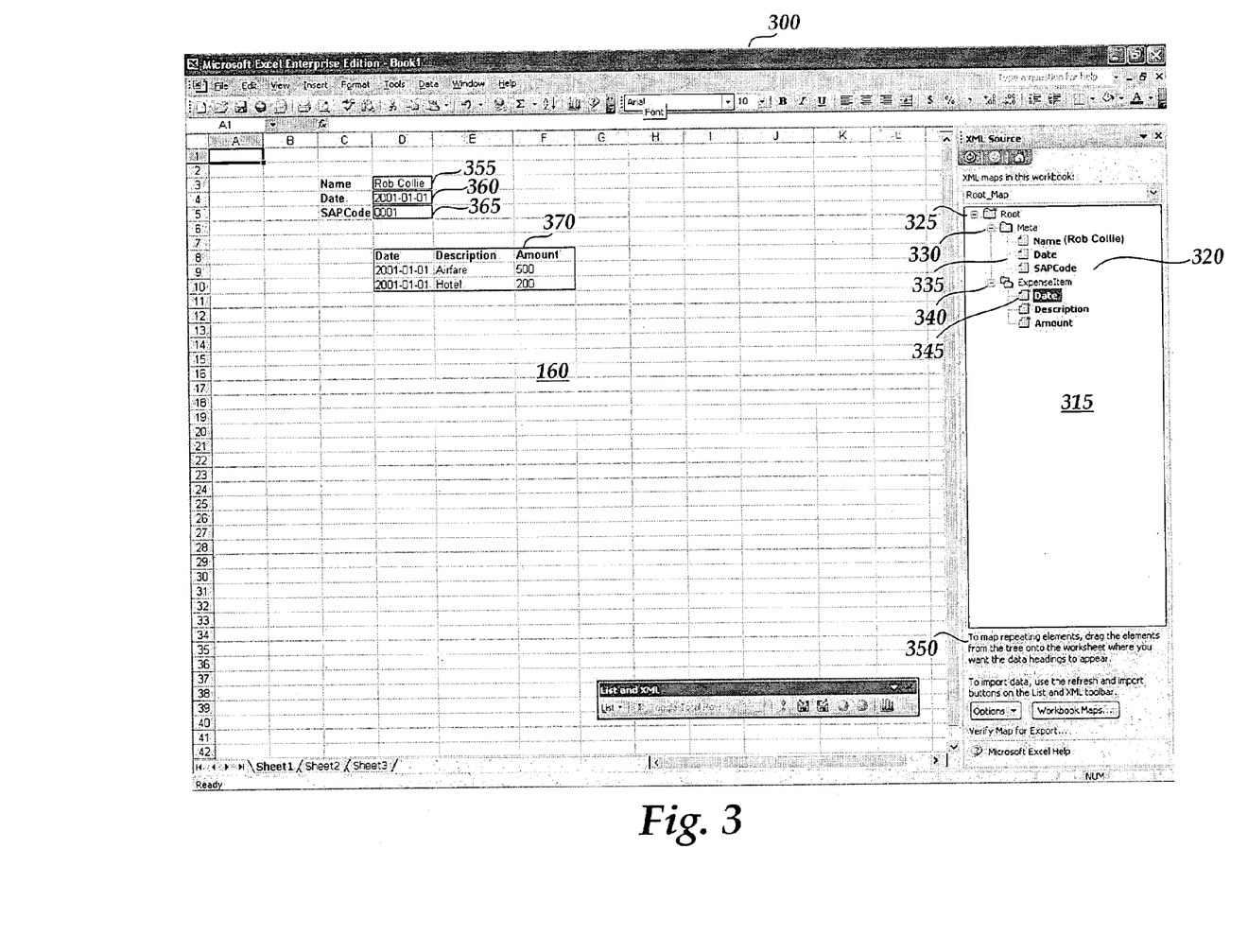
FIG. 3 illustrates a computer screen display of a typical spreadsheet workspace grid and associated tree view pane showing a generalized instance of an eXtensible Markup Language (XML) schema file associated with the based spreadsheet document opened to a spreadsheet application workspace grid.

FIG. 3 illustrates a computer screen display of a typical spreadsheet application workspace and an associated tree view pane showing a generalized instance of an XML schema file associated with the spreadsheet document. Further, FIG. 3 illustrates a mapping of XML elements or attributes of the XML schema file to a spreadsheet application workspace grid. According to the exemplary screen display 300 illustrated in FIG. 3, a spreadsheet application grid (hereafter "grid") 160 is illustrated for entering, manipulating, and calculating data including text and numeric data. On the right hand side of the screen display 300, a tree view 320 of a generalized instance of an XML schema file is presented in a task pane 315. The tree view structure 320 includes a root element 325, and child elements 330 and 340 and a plurality of child elements 335 and 345 under the elements 330 and 340, respectively. The tree view 320, illustrated in FIG. 3, represents a, generalized instance of an XML schema file attached to or associated with the spreadsheet document illustrated in the spreadsheet grid 160. Cells 355, 360, and 365 illustrate single non-repeating elements dragged to the grid 160, from the tree view structure 320. The list objects 370 illustrate repeating elements, <description>, <amount> and <date>, dragged from the tree view structure 320 to the grid 160. As illustrated in FIG. 3, data associated with those elements is also illustrated. The non-repeating element 355, 360 and 365 are shown structured in cells D3, D4, and D5 of the grid 160. Associated data is entered into each of those cells, as shown in FIG. 3. The single non-repeating element <date> and the repeating elements <description> and <amount> are annotated at target locations D8, E8, and F8 respectively. Associated data is shown as lists under headings associated with of those elements.

According to an embodiment of the present invention, dragging a given element or attribute from the tree view 320 to the grid 160 allows the user to annotate a target location in the grid 160 with markup language (for example, XML) structure associated with the dragged and dropped element or attribute. For example, referring to FIG. 3, the <date> element 335 is dragged from the tree view structure 320 to a target location Cell D4 in the grid 160. Data associated with that target location, for example "2001-01-01" illustrated in FIG. 3, is shown in the target spreadsheet Cell D4. Once the selected element or attribute is dragged from the tree view structure 320 and is dropped onto a target location in the spreadsheet grid 160, an XPATH marker is written to the target location to point the target location back to the XML schema element or attribute to which the target location is now associated.

The mapping of the XML elements or attributes to target locations in the spreadsheet grid, as described above, is advantageous because it allows the spreadsheet application to interact with other applications that are not compatible with or otherwise do not speak the same language of the spreadsheet. If the spreadsheet application imports XML data from a financial accounting system, for example, the accounting system does not have to know the data is being consumed by a spreadsheet application on the other end so long as the spreadsheet application can understand the XML data in question (via an XML data mapping). Likewise, if the spreadsheet application exports data back to that accounting system, the accounting system does not have to know the data is coming from the spreadsheet application so long as the data conforms to an XML schema that the accounting system understands. If the consumer wishes to extract the "date" from the spreadsheet grid 310, the consuming application may make use of the mapping between the <date> element of the marked-up of, language schema file to the grid location D4 to readily locate data associated with the "date" for extracting the data or otherwise utilizing the data. That is, in accordance with embodiments of the present invention, the annotation of the spreadsheet grid 160 with markup language structure and association of that structure with a markup language schema file for defining data associated with the structure is maintained in the grid document for subsequent use and consumption by other consuming spreadsheet applications or other types of application capable of consuming and using the markup language data now associated with the spreadsheet application grid 160.

Importing XML Data to a Spreadsheet Application Document

Figure 4:
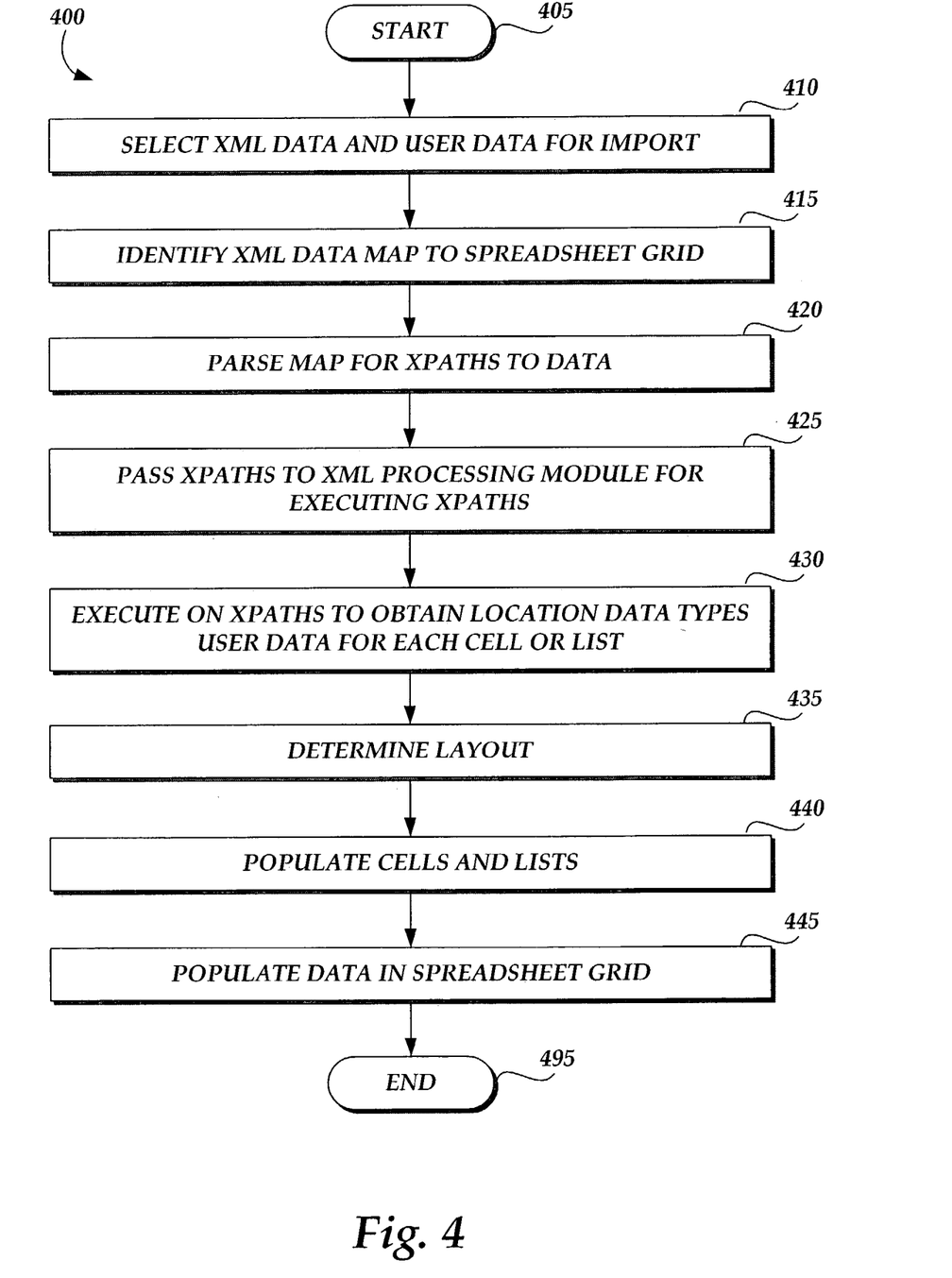
FIG. 4 is a flow chart illustrating a method for importing XML data into a spreadsheet document.

FIG. 4 is a flow chart illustrating a method for importing XML data into a spreadsheet document. In order to import an XML data file 100 into a spreadsheet document 150 via the spreadsheet application 120, illustrated in FIG. 1, the method 400 begins at start step 405 and proceeds to step 410 where a data file including XML data is selected for importing to a spreadsheet application grid 160 of a spreadsheet document 150 via a spreadsheet application 120. As should be understood, the selection of a file may be done via an import function where a user is allowed to import data from a file or to import an entire file into the grid 160 via of spreadsheet application 120. In the case of an import operation, the user chooses a source that gives XML data to the spreadsheet application grid. The source may be a file containing the XML data, or a stream of bytes containing XML data, or a web-based service, or any other application that outputs XML data.

In order to import and utilize XML data of the imported file, the file must have been associated with an XML schema file, and the XML schema must have been mapped to the spreadsheet grid. At step 415, the spreadsheet application identifies the XML data mapping that corresponds to the incoming XML data file. The matching XML data map corresponding to the XML data is found by matching the root name and namespace of the XML data with that of the XML schema file associated with all the maps in the spreadsheet document. If more than one XML data mapping is available for the imported document, the user is queried via a user interface to select one of the multiple available mappings. For example, if the imported XML document contains XML data for quarterly sales figures, a first XML mapping may have been prepared, as described with reference to FIG. 3, using an XML schema file that defines the XML data where only the aggregate sales for each quarter are mapped to the spreadsheet document to give a summary report. A second XML mapping may have been created in the same spreadsheet document where a different set of elements and attributes from the XML schema may have been mapped to give a detailed report of the sales data.

At step 420, the XML data mapping is parsed so that each element or attribute mapped to the grid is located. For instance, the first list object or single mapped cell is found which has a mapping that corresponds to the XML map being imported. If a single mapped cell is found, the XPATH associated with it is obtained. This XPATH is passed to a flattening module that parses the XML data by loading it into a document object model (DOM) parser that in turn fetches the data that corresponds to the XPATH. If a list object is found, all the XPATHs associated with the columns of the list are collected. The collection of XPATHs are passed to the flattening module which uses the DOM and the schema associated with the XML data map to determine the layout of the resulting data. The flattening module returns the data in a flat data structure that can be populated in the spreadsheet document. As is known to those skilled in the art, DOM parsers are tree-based parsers that load an entire XML file into memory and SAX parsers are event-based parsers capable of reading XML nodes (elements and/or attributes) sequentially, one at a time. According to document object models, a document is presented as a logical structure rather than as a collection of tagged words. The document object model is a means of defining a document as a tree-like hierarchy of nodes in which the document is an object containing other objects, such as images and forms. An example of a DOM parser is MSXML DOM provided by Microsoft Corporation of Redmond, Wash. For a detailed description of a suitable flattening module, see U.S. patent application Ser. No. 10/376,442, entitled "Method and System for Converting a Schema-Based Hierarchical Data Structure into a Flat Data Structure," which is incorporated herein by reference as if frilly set out herein.

At step 425, once all XPATHs marked in the imported data file are obtained by the DOM parser, the XPATHs are passed to the XML processing module 105 for executing the XPATHs. At step 430, the XML processing module 105 executes each XPATH, one by one, against the XML data file to locate all cells and list object ranges and for finding associated XML elements or attributes applied to those cells and list object (list) ranges from the associated XML schema file.

At step 435, after each XPATH located in the XML data mapping for the imported document is executed to obtain the cell or list object list range locations for the XML data and the user data and for relating back to the associated schema file for associated XML schema definitions, a layout for the grid 160 of the spreadsheet worksheet associated with the imported data file is determined by the spreadsheet application 120 in conjunction with the XML processing module 105. At step 440, the cells and list object list ranges of the grids 160 are populated with associated XML data.

According to an embodiment of the present invention, when the data is populated in the spreadsheet grid 160 for use by the user, the data is converted from a hierarchical data structure associated with the data mapping into a flattened structure for rendering a presentation in the spreadsheet application grid. For a detailed description of a methods and systems for converting the hierarchically-structured data into a flattened data structure for presentation to the user in the spreadsheet grid, see U.S. patent application Ser. No. 10/376,442, entitled "Method and System for Converting a Schema-Based Hierarchical Data Structure into a Flat Data Structure," which is incorporated herein by reference as if fully set out herein. As should be understood, after the data obtained from the flattening module is properly formatted and populated into the spreadsheet cells or lists, the process continues again until all data for all the cells and lists associated to the XML mapping are imported into the spreadsheet grid. The method ends at step 495.

Exporting XML Data from a Spreadsheet Application Worksheet

Figure 5:
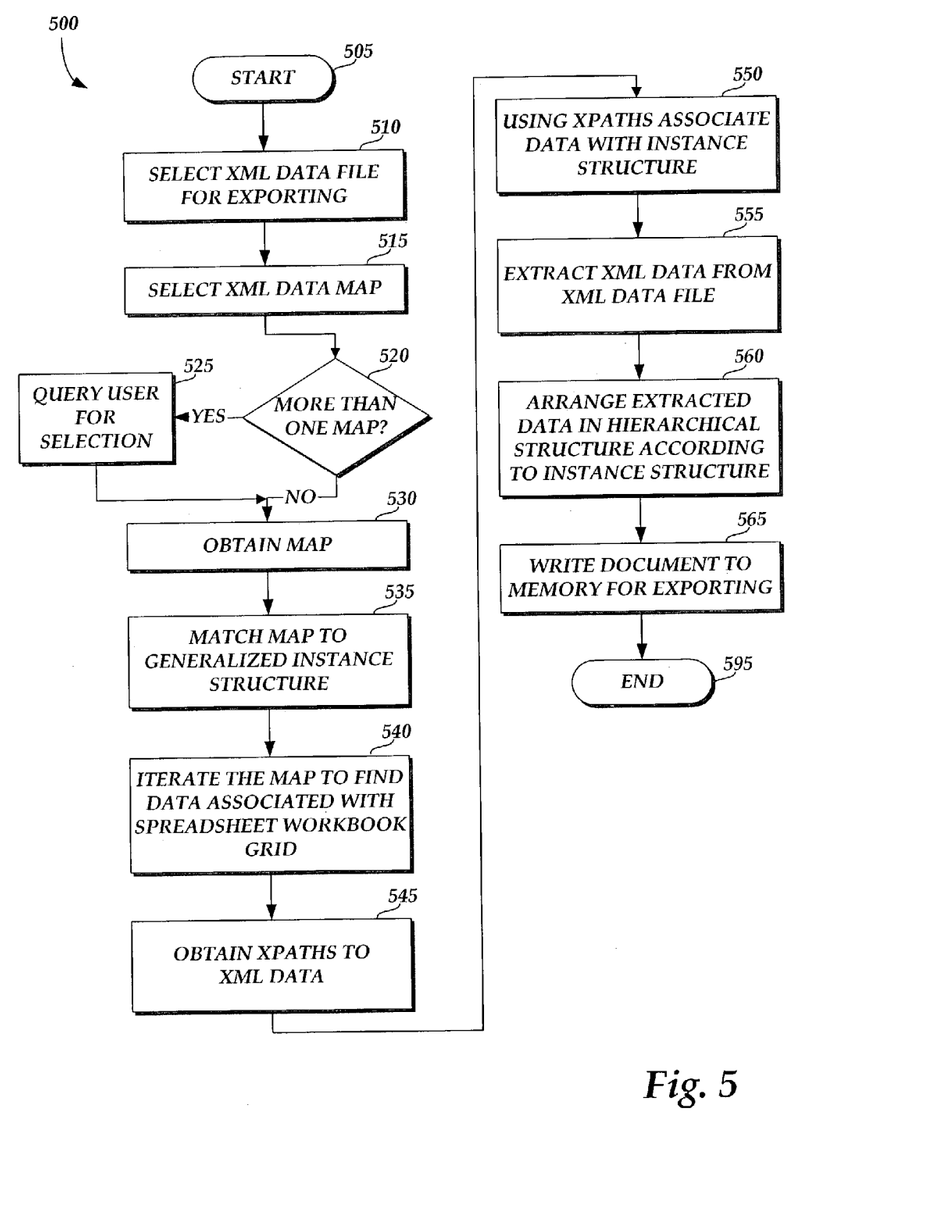
FIG. 5 is a flow chart illustrating a method for exporting XML data from a spreadsheet document.

Referring to FIG. 5, after a user has imported XML data to the spreadsheet application grid 160 for editing, as described with reference to FIG. 4, or after the user has created a new XML document and mapped an associated schema file to that document, the user may export the XML document along with XML markup, XML data, and XML data mapping for subsequent use. According to embodiments of the present invention, the user may also export an XML document where XML structure is associated (via a schema (XSD)) to a spreadsheet having pre-existing data. Advantageously, upon export, all relationships created between cell and list object locations in the spreadsheet application grid 160 and the associated schema file are maintained for subsequent use by any other XML-enabled application. Referring to FIG. 5, a method for exporting XML data from a spreadsheet document according to an embodiment of the present invention is described. The method 500 begins at start step 505 and proceeds to step 510 where an XML data file is selected for exporting. As briefly described above, the XML data file may be a data file previously imported, as described with reference to FIG. 4, or the data file may be a new file created by the user who now desires to export the data file. According to an embodiment of the invention, the user may be prompted for a name of a file that will be created and to which the XML document will be written. If the named file already exists, the user may be prompted as to whether to overwrite the file or to choose a different file name.

At step 515, an XML data mapping defining the relationship between XML data in the document to be exported and an associated schema file is selected. The XML data mapping selected for the export of the data may be the mapping used for importing the data, as described above with reference to FIG. 4. Alternatively, if the data file to be exported is being created by the user, an XML data mapping between the document grid 160 and an associated schema file may be created, as described above with reference to FIG. 3. At step 520, a determination is made as to whether more than one XML data mapping is present. If there is more than one, the user is prompted to specify which mapping to export. As described above with reference to FIG. 4, the document previously imported by the user, or being created by the user may have more than one mapping associated with an XML schema file. If more than one XML data mapping is present, the method proceeds to step 520, and the user is queried via a user interface for a selection of one of multiple data mappings. Once a mapping is selected, the method proceeds to step 530, and the XML data mapping is obtained for use in preparing the data for exporting.

At step 535, the XML data mapping is matched to a generalized instance structure created for the associated schema file, as described above with reference to FIG. 3. As described above, the generalized instance structure is a tree-like hierarchical representation of an XML hierarchical data structure where all available elements and/or attributes of an associated schema file are applied to the document. That is, the instance structure represents a potential hierarchical data structure of a document having all potential elements and/or attributes of an associated schema file applied to the document. At step 535, the selected XML data mapping is matched to a corresponding generalized instance structure. For example, if the XML data mapping was prepared in association with a purchase order schema file at step 535, that XML data mapping is matched to a corresponding generalized instance structure prepared for the purchase order schema file.

At step 540, the XML data mapping's generalized instance structure is passed to the XML processing module 105. The XML export module iterates the grid's data to extract references to the data associated to the mapping specified by the user. The references are stored in the generalized instance structure. According to an embodiment of the present invention, the XML processing module walks through the XML data mapping node by node for the document to be exported to find the location of and content of XML data applied to the document. Advantageously, iteration of the map to find data associated with the spreadsheet document allows the XML export module to associate data contained in the spreadsheet document with corresponding XML structure in the generalized instance structure so that the location and hierarchical order of the data may be determined for the eventual export of the data for subsequent use.

At step 545, the XML processing module 105 locates each element and/or attribute applied from the associated schema file to the spreadsheet document via the mapping between the generalized instance structure of the XML schema file to the spreadsheet document. For each reference in the XML data mapping located by the XML export module, the XML export module obtains an XPATH marking the location of the XML data in the document and pointing that location and data back to the XML schema file. For example, if the XML export module comes to a first reference in the XML data mapping that is representative of a <first name> XML data element, the XML processing module 105 obtains the associated XPATH, for example, "//purchaseorder/person/fname" for pointing to the <first name> child element of the element <person> which in turn is a child element of the element <purchaseorder> of an associated purchase order schema file applied to the document. In effect, each cell or list object annotated with XML data according to the associated XML schema file is located by walking a list of XML data mappings. The associated XPATH locating a cell or list object and data associated therewith is used to apply the XML data to the generalized instance structure of the associated XML schema file to prepare a hierarchically-structured representation of the XML data and associated user data contained in the document. At step 550, each XPATH obtained by the XML export module and associated with a given XML data element or attribute applied to the document is used to associate each applied element or attribute to the generalized instance structure associated with the selected XML schema file. In effect, the generalized instance structure is "filled in" to indicate which elements and/or attributes of the generalized instance structure of the selected XML schema file are actually applied to the document.

If the location of a single non-repeating element or attribute is found, the associated XPATH for the location and the associated data will be pushed out to the generalized instance structure, as described above. However, if during iteration of the map at step 540, a list object is found having a cell range, for example cell C5 through cell C15, an indication is made that the list object is associated with a repeating element in generalized instance structure of the associated XML schema file. In response, the XML export module analyzes the hierarchical structure of the generalized instance structure to find the XML element associated with the list found in the application document and determines the minimum number of repeats associated with the element. This is required in order to ultimately know where the associated data is located in the document so that the data may be pushed out to the generalized instance structure for creating a hierarchically-structured representation of the XML document for export.

At step 555, the mapped data associated with each XPATH in the document is extracted, and at step 560 the extracted data is arranged by the XML export module 37 according to the generalized instance structure. In order to arrange the extracted data in a hierarchical structure, the XML processing module 105 walks down the generalized instance structure one node at a time to prepare the data for writing to memory and for validating the data against the XML schema file. For example, if the DOM parser and SAX module locates a first element corresponding to a single non-repeating <name> element, the data, if any, contained in the cell associated with that element is validated against the <name> element of the associated schema file. That is, if the <name> element requires a first name, followed by a middle name, followed by a last name, the DOM parser and SAX module determine if the associated data is valid according to that data type and structure. If the data is not valid, a schema validation error may be presented to the user.

If the XML processing module locates a list object that repeats, for example ten times, according to the generalized instance structure of the XML schema file, then associated data of the ten cells are arranged for the eventual export. With each cell in the column that is arranged, data associated therewith is validated against the XML schema file, described above. According to a preferred embodiment of the present invention, the rendering of the data according to the associated schema file is honored unless the rendering dictated by the schema file will cause a loss of user entered data. For example, if the associated schema file requires that an annotated cell contain a whole number, but the user-entered a decimal value (for example, whole number 8 versus decimal number 8.5), the decimal value will be written out to memory, and the user will be provided with an XML schema validation error.

At step 565, the XML export module via the SAX module writes out the hierarchically-structured data to memory for subsequent import and use as described above with reference to FIG. 4. As should be understood a variety of options are available when the data is written out to memory at step 565. The data may be written to memory for future import as described with reference to FIG. 4, or the data may be transformed using a transformation file such as an eXtensible Stylesheet Language Transformation (XSLT) file to transform the data into a different format for subsequent consumption, for example, consumption by a Hypertext Markup Language processing module. Alternatively, at step 565 the data may be sent to another user for import by the second user utilizing another spreadsheet application program 120, or alternatively, for import by a different software application, such as a word-processing application. If the document is sent to another user for import by the second user utilizing a separate software application program, such as a word processing application, the spreadsheet functionality associated with the document created by the first user may be lost, but advantageously, the XML formatting of the data including XML tags and application of elements and/or attributes from the associated schema file are maintained in the data for use by the second user.

Additionally, during the process of writing out the data to memory at step 565, a determination may be made based on the associated schema file as to whether or not a given element is optional. That is, according to one embodiment, a determination may be made as to whether an element applied to the document that should be rendered according to the associated schema file may nonetheless be omitted where, for example, rendering the element will generate a blank cell. For example sometimes an element is expressed that is not optional, but the element does not have data in the document location to which it is applied, for example, a NIL value. If a cell has an Integer data type according to the associated schema file, but the cell does not have an expressed value, a zero(0) cannot be expressed in the cell because a zero is a valid Integer data type that in all probability does not convey the intent of a cell with no data content. For another example, say a <price> element is optional, and twenty <price> elements must be parsed according to the general instance structure of the associated schema file. If the schema file dictates that the <price> element is required, each time a <price> element is parsed having no associated price items (user data) an empty element is written. An empty element is shorthand for having an open tag and a closed tag with nothing in between.

As is known to those skilled in the art, in the described example case XML syntax may be written to prevent an empty cell from filling in with zeros. For example, when a cell has no data content, XML syntax may be written to prevent that empty cell from filling in with zeros. As described above, one example is an empty element that is required and another example is where a number data type such as an Integer data type is required and the user does not enter data to the cell. In either of these cases, writing a blank as a description would not be valid against the associated schema file, and a schema validation error would occur and likely confuse a user. According to one embodiment, if the XSD defines the element to be "nillable" a NIL value is written to the cell by writing an attribute of "xsi:nil='true'" where the namespace prefix "xsi" is associated to the namespace in that location so that the schema validation process will ignore the cell. On export, the element may be tagged stating that the cell should be expressed as a NIL value that will prevent a validation error from being provided to the user. If an element is required, but where no data is provided, according to one embodiment, the element may be written out to memory at step 565 to adhere to the associated schema file, and an empty element may be written out even though it is invalid versus the schema file, but where it is the best interpretation of the user's desires. A schema validation error may then be presented to the user to alert the user.

CONTEXTUAL AWARENESS

According to embodiments of the present invention, mapping XML data to the spreadsheet grid, as described herein, may also expose application programming interfaces (API) that allow a programmer to "peer into" the XML map and use it for other purposes. According to a first aspect of this embodiment, if a programmer is working with a specific XML schema such as a purchase order (PO) schema, she may want to write a custom program that provides the user with actions such as "Check status of this purchase order" wherever purchase order data is encountered, and the programmer may want those actions to show up "inline" in the spreadsheet document. Because the XML mapping feature, described above, allows the PO schema to be used in different spreadsheet documents (each providing a different "view" of the XML purchase order data), the programmer cannot write a program that works in all places. For example, the "Check status" action needs to have access to the <id> element of the PO data in order to know which purchase order it should look up for the user. The programmer therefore needs a way to "discover" whether the <id> element is present at all in the spreadsheet document. Once it has been determined that the <id> element is present, the program code needs to know where the <id> element is mapped in the grid. Once the program code knows where the <id> element is mapped, the program code is able to fetch the value of the spreadsheet cell to which the <id> element is mapped, as described above. The program code may also use this location to draw the appropriate user interface (button, etc.) in the vicinity of that spreadsheet cell.

The objects are declared that will hold the location and value results to be obtained as described above. The element XPATH of the element needed by the programmer is passed to an XmlMapQuery method to find the location of the element. In response, a Range object is returned which represents some area in the spreadsheet application spreadsheet. If the desired element does not exist, meaning it has not been mapped into this particular spreadsheet, the Range returned will be 'empty' or un-initialized. In response, the programmer/user checks for an "empty" Range before continuing. If the Range is not empty, a call is made (e.g., XmlDataQuery) to fetch the Range that contains the actual data for the Range. XmlMapQuery and XmlDataQuery in many cases return the exact same Range. However, element mappings may contain extra information, such as headers, which would be returned by XmlMapQuery, whereas XmlDataQuery returns just the data.

In addition, sometimes a mapping for a particular element may exist, but no data may exist in the mapping yet, in which case XmlDataQuery would return an "empty" Range, while XmlMapQuery would return valid Range. In such cases, the programmer/user may first query for the existence of the mapping using XmlMapQuery before accessing the value of that mapping with XmlDataQuery. Next, a determination is made as to whether the mapping (Range) contains any data. The location of the data in the spreadsheet can be obtained from the Range. Accessing the value of the element is also done with this Range. The Range may contain more than one cell, but for the purposes of the example, only the first cell having a Range "IdRange" is accessed.

According to a second aspect of this embodiment, if the programmer/user may desire to write a program that is able to work with multiple different XML schemas. For example, consider an automobile company that produces cars, trucks, and buses where there is an XML schema for each type of vehicle that describes all of the parts that go into that type of vehicle. The company may also have a general-purpose spreadsheet template for ordering parts. Users must customize that template by mapping the appropriate elements from one of the three schemas to the "Order Table" section of the spreadsheet. Once they have created the mapping, they can fill out the Order Table.

Continuing with the example, the programmer may want to provide the users with actions that help them fill out the order table, for example, an action like "Get quote." The programmer already knows where the Order Table is in the spreadsheet, but does not know which schema (cars, trucks, buses) the user will have mapped in each case, nor the elements that the user mapped from the particular schema. The programmer first declares the objects that will hold the results to be obtained below. Next the programmer addresses a Range in the spreadsheet corresponding to one of the columns in the "Order Table". For example, the programmer looks up the "Part Number" column in the table, and retrieves the XML XPATH information from that Range. The programmer then checks to make sure that the column is indeed mapped before proceeding. The XPATH object provides useful information to the programmer. For example, the XPATH may give the programmer the XPATH identifier of the element that is mapped to this column. According to the present example, the programmer may be interested in identifying the schema that is mapped to this table, so that she knows how to appropriately request a price quote. She does this by accessing the XmlMap object (via XPath.Map) associated with XPATH object, followed by retrieving the namespace value from RootElementNamespace that uniquely identifies the schema being used. After the programmer knows which schema is in use in this table, she performs the action that is appropriate to the given schema, such as inserting a code to get a quote for car parts.

As described herein, embodiments of the present invention relate to importing markup language data to and exporting markup language data from a spreadsheet application grid. It will be apparent to those skilled in the art that various modifications or variations may be made in the present invention without departing from the scope or sprit of the invention. Other embodiments of the invention will be apparent to those skilled in the art from consideration of this specification and practice of the invention disclosed herein.

We claim:

1. A method of utilizing markup language data in a spreadsheet document, comprising:

selecting a data file containing markup language data for importing into a spreadsheet document whereby the data file has applied markup language data mapped to the spreadsheet document;

identifying a markup language data mapping whereby each element or attribute of the markup language data applied to the data file is mapped to an associated schema file for defining data definitions for the elements or attributes applied to the spreadsheet document;

parsing the markup language data mapping to obtain pointers associated with markup language elements and attributes applied to the data file pointing to the applied elements and attributes of the associated schema file, whereby parsing the markup language data mapping to obtain pointers associated with markup language elements and attributes applied to the data file pointing to the applied elements and attributes of the associated schema file includes parsing the markup language data mapping to obtain pointers saved to positions in the data file associated with each element or attribute applied to the data file for pointing each element or attribute applied to the data file to a corresponding data definition in the schema file, whereby the step of parsing the markup language data mapping to obtain pointers associated with markup language elements and attributes applied to the data file pointing to the applied elements and attributes of the associated schema file includes parsing the markup language data mapping with a document object model parser and obtaining XPATHs written to the data file pointing elements applied to the data file to data definitions for each element or attribute applied to the data file from the associated schema file;

executing each pointer to find locations of elements or attributes applied to the data file;

executing each pointer to the schema file to obtain markup language data definitions applicable to the elements or attributes according to the schema file;

determining a layout for rendering the data file to the spreadsheet document based on the locations of each of the elements or attributes applied to the data file; and rendering the data file in the spreadsheet document whereby the elements or attributes in any user data associated with the elements or attributes are positioned in the spreadsheet document according to the layout.

2. The method of claim 1, whereby the step of rendering the data file in the spreadsheet document includes rendering the data file in the spreadsheet document whereby any user data associated with the elements or attributes are positioned in the spreadsheet document according to the layout.

3. The method of claim 1, whereby identifying a markup language data mapping includes matching a root name of a markup language namespace associated with the schema file to root elements applied to the data file.

4. The method of claim 3, whereby if more than one data mapping is identified for the data file, selecting one mapping from the one or more data mappings.

5. The method of claim 4, whereby selecting one data mapping from the one or more data mappings includes querying a user for a selection of the one data mapping from the one or more data mappings.

6. The method of claim 5, whereby querying a user for a selection of the one mapping includes querying the user via a user interface.

7. The method of claim 1, further comprising passing the each pointer to a markup language processing module.

8. The method of claim 1, whereby the step of executing each pointer to find locations of elements or attributes applied to the data file includes obtaining the elements and attributes applied to the data file for rendering the data file in the spreadsheet document.

9. The method of claim 8, further comprising obtaining any user data in the data file associated with elements and attributes applied to the data file for rendering in the spreadsheet document.

10. The method of claim 9, whereby the locations of elements or attributes applied to the data file correspond to cells of a spreadsheet application grid for rendering the spreadsheet document.

11. The method of claim 9, whereby the locations of elements or attributes applied to the data file correspond with list ranges for list objects of a spreadsheet application grid for rendering the data file in the spreadsheet document.

12. The method of claim 1, prior to the step of rendering the data file in the spreadsheet document, populating the locations of each element or attribute with the corresponding element or attributes and markup language data definitions from the associated schema file.

13. The method of claim 12, further comprising populating the locations of each of the elements or attributes with any associated user data.

14. The method of claim 13, whereby the step of rendering the data file in a spreadsheet document includes converting the data from a hierarchical structure to a flattened data structure for rendering the data in the spreadsheet document.

15. The method of claim 14, further comprising formatting any user data rendered in the spreadsheet document according to the data definitions associated with an element or attribute applied to the location of the any user data according to the associated schema file.

16. The method of claim 1, further comprising modifying the elements or attributes applied to the data file including applying additional elements or attributes to the spreadsheet document from the associated schema file.

17. The method of claim 16, whereby the step of modifying the elements or attributes applied to the data file includes deleting elements or attributes from the spreadsheet document.

18. The method of claim 16, further comprising modifying any user data applied to the spreadsheet document associated with the elements or attributes applied to the spreadsheet document according to the associated schema file.

19. The method of claim 18, further comprising the step of updating the mapping to include modifications to any elements or attributes applied to the data file and to include modifications to any user data applied to the data file.

20. The method of claim 19, further comprising exporting the modified data mapping, the modified elements or attributes and the modified user data for subsequent rendering in a second spreadsheet document according to the modified mapping and associated schema file.

21. The method of claim 19, prior to the step of updating the mapping, modifying the elements or attributes applied to the data file according to the schema file.

22. The method of claim 1, whereby the markup language is eXtensible Markup Language.

23. The method of claim 1, whereby matching the selected data mapping to an instance structure of the associated schema file includes matching the selected data mapping to an instance structure representing all available elements and attributes of the associated schema file that may be applied to the spreadsheet document.

24. A computer readable medium having computer executable instructions contained thereon which when executed by a computer perform the following steps for utilizing markup language data in a spreadsheet document:

selecting a data file containing markup language data for importing into a spreadsheet document whereby the data file has applied markup language data mapped to the spreadsheet document;

identifying a markup language data mapping whereby each element or attribute of the markup language data applied to the data file is mapped to an associated schema file for defining data definitions for the elements or attributes applied to the spreadsheet document;

parsing the markup language data mapping to obtain pointers associated with markup language elements and attributes applied to the data file pointing to the applied elements and attributes of the associated schema file, whereby parsing the markup language data mapping to obtain pointers associated with markup language elements and attributes applied to the data file pointing to the applied elements and attributes of the associated schema file includes parsing the markup language data mapping to obtain pointers saved to positions in the data file associated with each element or attribute applied to the data file for pointing each element or attribute applied to the data file to a corresponding data definition in the schema file, whereby the step of parsing the markup language data mapping to obtain pointers associated with markup language elements and attributes applied to the data file pointing to the applied elements and attributes of the associated schema file includes parsing the markup language data mapping with a document object model parser and obtaining XPATHs written to the data file pointing elements applied to the data file to data definitions for each element or attribute applied to the data file from the associated schema file;

executing each pointer to find locations of elements or attributes applied to the data file;

executing each pointer to the schema file to obtain markup language data definitions applicable to the elements or attributes according to the schema file;

determining a layout for rendering the data file to the spreadsheet document based on the locations of each of the elements or attributes applied to the data file; and rendering the data file in the spreadsheet document whereby the elements or attributes in any user data associated with the elements or attributes are positioned in the spreadsheet document according to the layout.

* * * * *